Jan. 22, 1963  R. J. WOHL  3,074,269
WIDE RANGE ELECTRODYNAMIC ACTUATOR
Filed Jan. 30, 1959  6 Sheets-Sheet 3
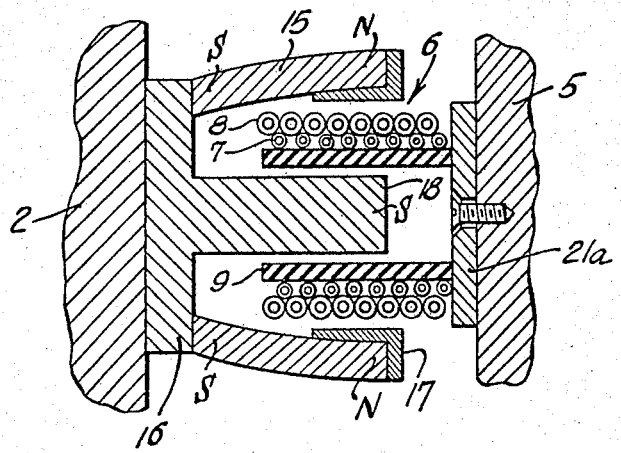
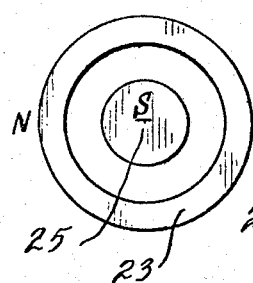
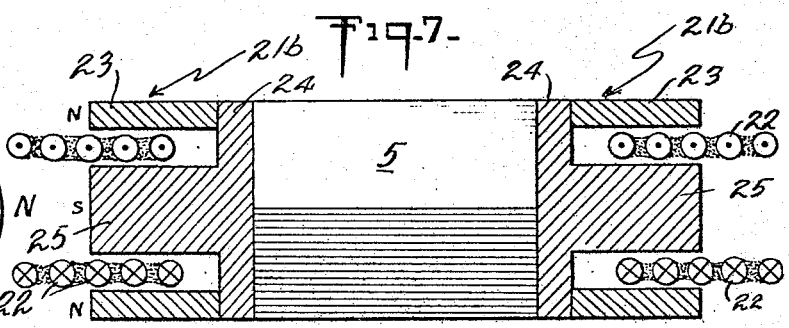
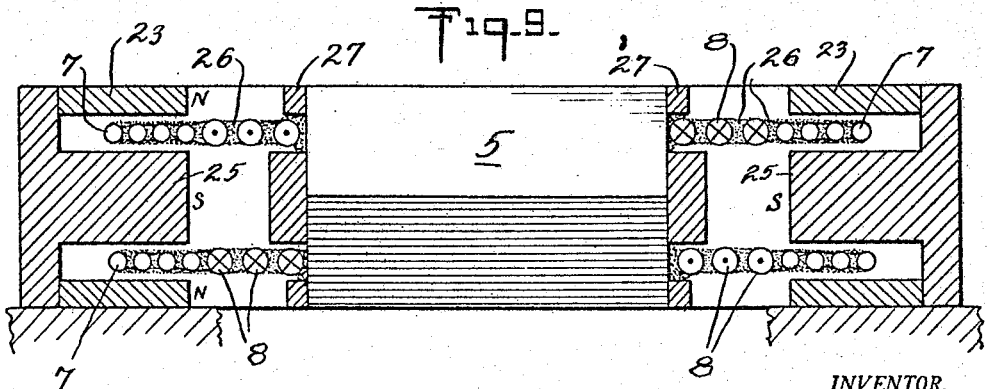
INVENTOR.
ROBERT J. WOHL
BY
ATTORNEYS

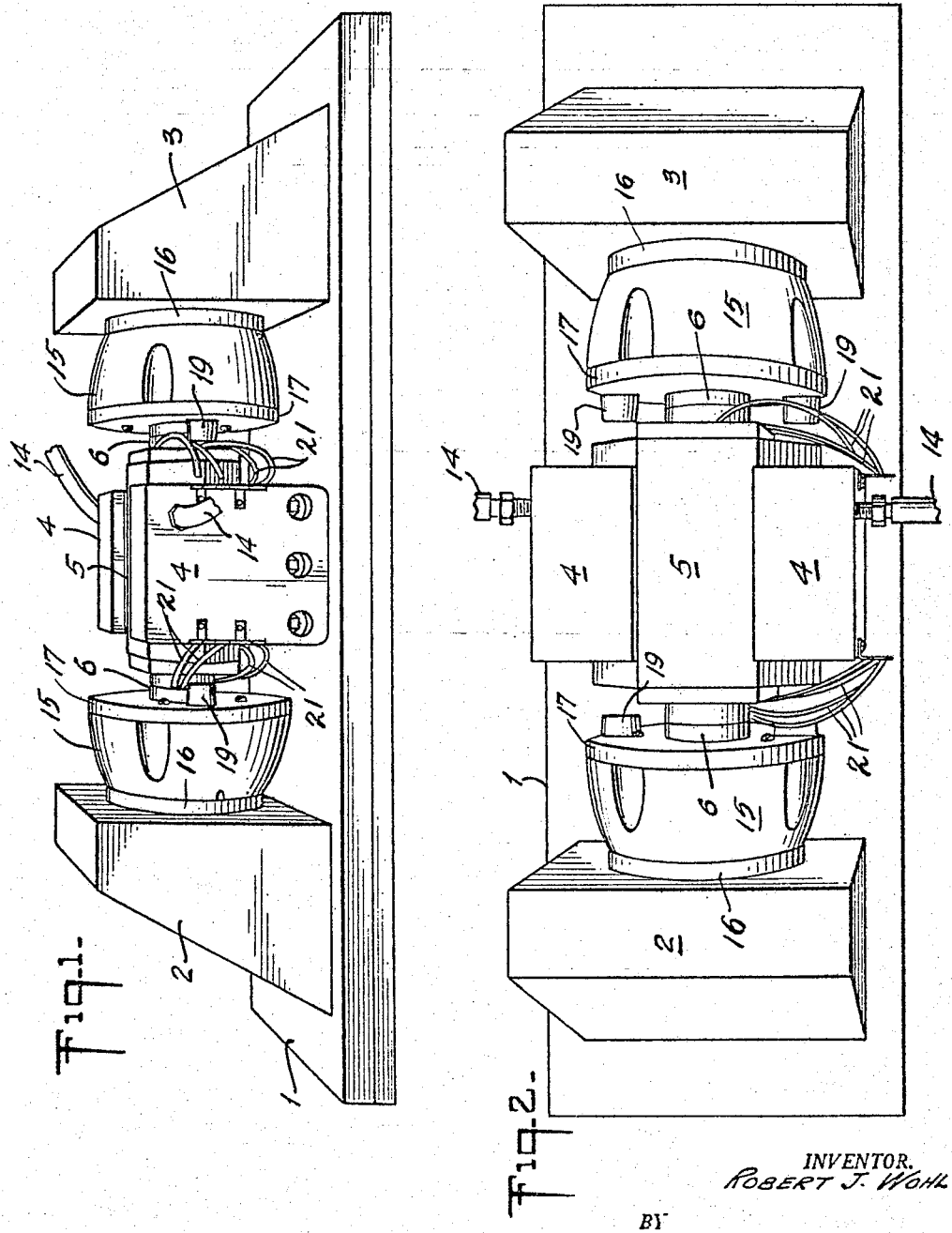
Jan. 22, 1963     R. J. WOHL     3,074,269
WIDE RANGE ELECTRODYNAMIC ACTUATOR
Filed Jan. 30, 1959     6 Sheets-Sheet 1
INVENTOR.
ROBERT J. WOHL
BY
Max H. Farmer
ATTORNEYS

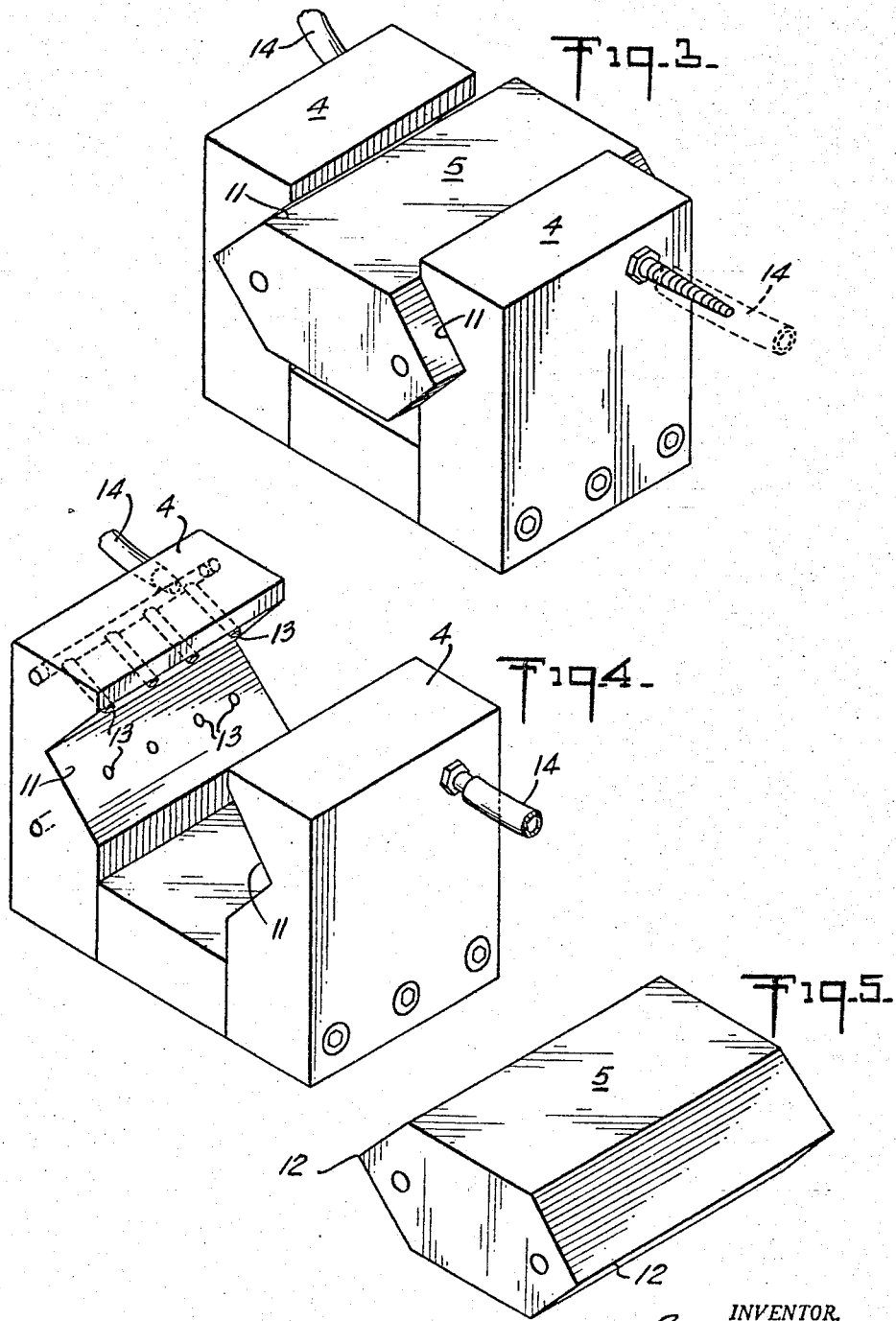

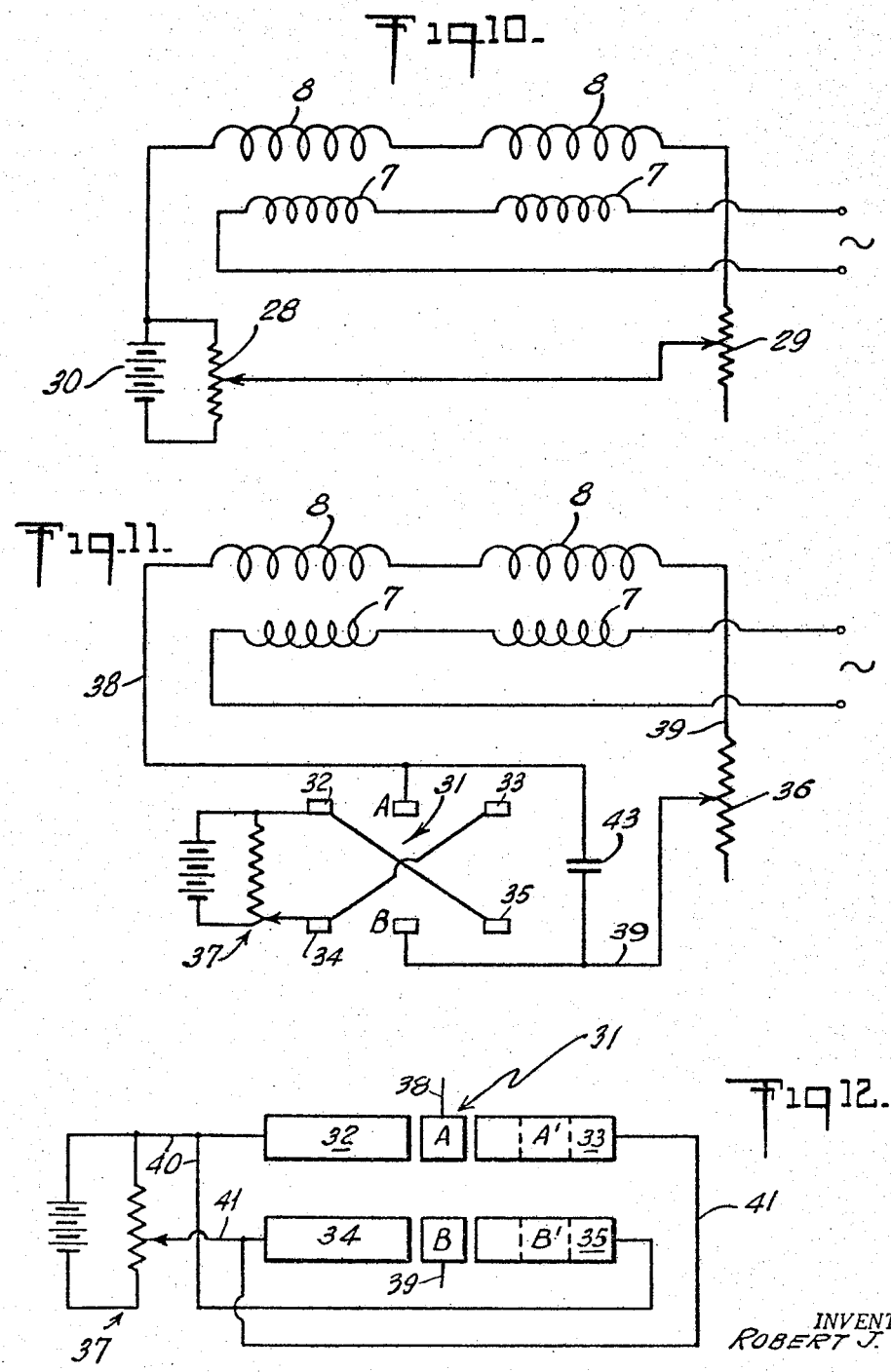

Jan. 22, 1963  R. J. WOHL  3,074,269
WIDE RANGE ELECTRODYNAMIC ACTUATOR
Filed Jan. 30, 1959  6 Sheets-Sheet 5
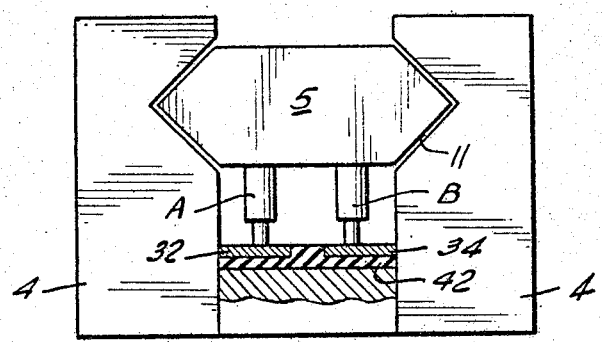
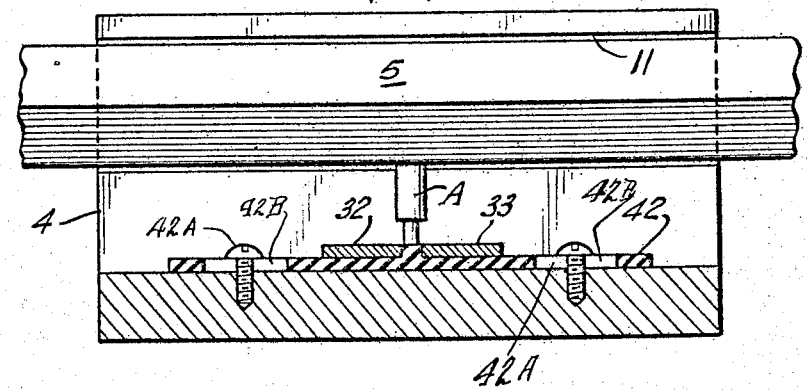
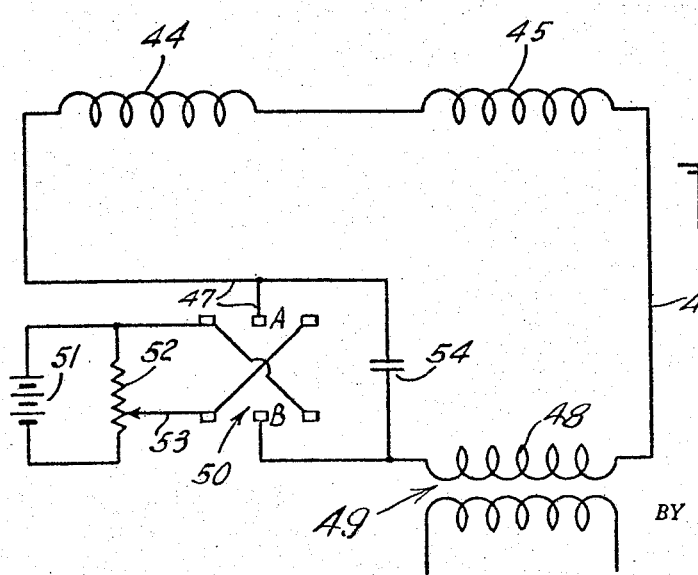
INVENTOR,
ROBERT J. WOHL
BY
Max H. Farmer
ATTORNEYS

United States Patent Office 3,074,269
Patented Jan. 22, 1963

3,074,269
WIDE RANGE ELECTRODYNAMIC ACTUATOR
Robert J. Wohl, 14 Park Circle, Great Neck, N.Y.
Filed Jan. 30, 1959, Ser. No. 790,300
6 Claims. (Cl. 73—71.6)
(Granted under Title 35, U.S. Code (1952), sec. 266)

The invention described herein may be manufactured and used by or for the Government of the United States of America for governmental purposes without the payment of any royalties thereon or therefor.

This invention relates to actuators that may be used to subject specimens to be tested to linear movements or vibrations of selected frequencies and to shock conditions, such as those to which the specimens may be subjected to in use, and more particularly to electrodynamically operated vibrators for this purpose. In prior vibrators, the table has usually been restored to a selected reference position by spring supports, and when specimens that are to be tested for their resistance to vibration are mounted on the vibrating table in a manner to unbalance the table, canting and unwanted vibrations are introduced into the table movements, so that one cannot segregate the influence on such specimen of only a selected vibration frequency.

Present-day equipment for evaluating the mechanical characteristics of electronic equipment and components, such as electron tubes, has shown a clear trend toward higher frequencies of excitation, and towards the direction of employing complex-wave testing procedures. The latter includes the mechanical reproduction of random noise excitation as a simulation of generalized environments, as well as the reproduction of actual field excitation in the test laboratory. The latter is achieved by recording on magnetic tape the output of an accelerometer mounted on the vehicle in question, while in operation, at the point where the equipment is to be installed. Then, the tape is played back in the laboratory, and the output amplified sufficiently to drive an electrodynamic vibrator. In the cases of both random noise and field excitation reproduction, the equipment or component mounted on the vibration table is subjected to a mechanical motion which is intended to be a faithful reproduction of the electrical signals.

It is in the latter statement that the weaknesses of present-day equipment are most apparent. In order to achieve the desired reproduction, the vibration machine must have no resonances in the frequency band of interest, the response must be linear with respect to frequency, amplitude and phase, and transverse motion (that component normal, to the desired direction) must be minimized. Furthermore, for greatest flexibility, the frequency range over which these properties are maintained must be wide, and the equipment should be capable of handling massive loads.

Since the best of the most modern machines can meet these latter requirements only up to 5000 cycles (and even at that has many limitations in the areas of distortion and transverse components), and requires expensive electronic driving equipment and critical adjustments for each load, improved equipment is needed. This need is aggravated by the desire to expand the frequency band to 10,000 and even 20,000 c.p.s.

Objects of this invention are to provide an actuator capable of linear movements in a wide band of frequencies, with which mounting of specimens on a table in a manner to unbalance the table will not cant the table and affect its linear movements; which will be free of push rods, linkages and mounting springs with their attendant resonances; which, being free of such mounting springs, can employ a table sufficiently heavy so as to be essentially uninfluenced by the resonances of massive specimens under test, and stiff enough to avoid table breakup into resonant modes, and yet not suffer the penalty of low-frequency resonances caused by table mass and spring stiffness; which, by incorporating levitation of the dead load and utilizing vibration in a horizontal plane, can employ a heavy vibrating table and can accommodate massive loads; which incorporates a design uniquely suited to accommodate large displacements of many inches, thereby being adaptable to the reproduction of shock impulses as well as sinuosidal or complex wave vibration of large amplitude; which possesses a unique non-linear restoring force such that canting of the table in its bearings is prevented, and transverse motion is reduced essentially to zero; which provides essentially frictionless mounting bearings, reducing temperature rise and driving energy loss; which employs simple electrical connections; and which will be relatively simple, durable, accurate, practical and inexpensive.

Another object of the invention is to provide improved, simple, practical and efficient means for causing linear movements of a table of an actuator, and for restoring the table to a selected reference position automatically whenever movements of the table are interrupted, also for damping the table movements; and with which the restoring and damping forces and the reference position may be varied selectively.

Another object is to provide an improved electrodynamic actuator that may be used to subject a specimen to vibratory movement of selected frequencies, and where the specimen support may be restored to selected and variable positions in its vibratory movements, and its movements variably damped.

Other objects and advantages will be apparent from the following description of some embodiments of the invention, and the novel features will be particularly pointed out hereinafter in connection with the appended claims.

In the accompanying drawings:

FIG. 1 is a perspective, as viewed from the front, of a simple actuator constructed in accordance with the invention;

FIG. 2 is another perspective of the same, as viewed from above it;

FIG. 3 is a perspective diagram of the movable table mounted in a linear air bearing;

FIG. 4 is a perspective of the support of the same, with the table removed;

FIG. 5 is a perspective of the removed table;

FIG. 6 is a sectional elevation of one end of the actuator of FIGS. 1 and 2, when the coil is formed of two parts, one part a driving coil and the other part a restoring coil;

FIG. 7 is a diagram illustrating a modification of the actuator shown in FIGS. 1 and 2;

FIG. 8 is a diagram illustrating an end view of the permanent magnet attached to the table but with the coil omitted;

FIG. 9 is a schematic drawing illustrating a modification of the actuator of FIGS 1 and 2;

FIG. 10 is a wiring diagram of a circuit that may be employed with the two part coils on the ends of the table in the actuator of FIG. 9;

FIG. 11 is a wiring diagram of a circuit that may be employed with the actuator shown in FIGS. 1 and 2;

FIG. 12 is another view of part of the circuit illustrated in FIG. 11;

FIGS. 13 and 14 are respectively a longitudinal sectional elevation and an end elevation of the table and its support, as modified to employ the wiring in the circuit diagram shown in FIGS. 11 and 12;

FIG. 15 is a wiring diagram of a circuit that may be employed with the single coil parts of FIG 7;

Figure 16:
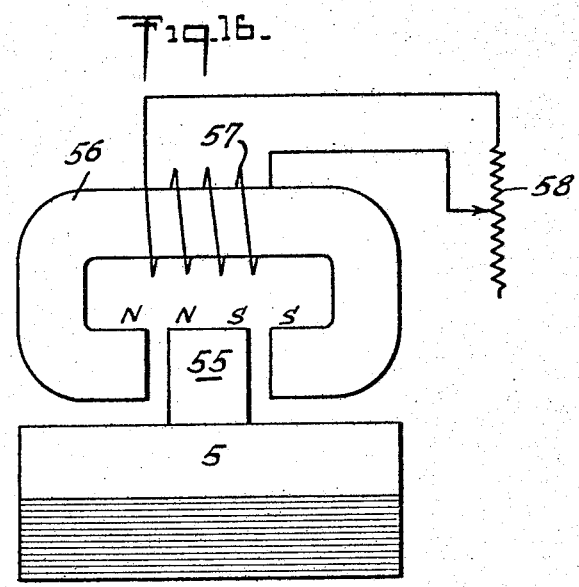
FIG. 16 is a schematic drawing illustrating a further possible modification of the actuator.

In the embodiment of the invention illustrated in FIGS. 1–6, the actuator includes a base 1 having thereon two upstanding, spaced apart abutments 2 and 3 and between and spaced from them an upstanding table support 4 which mounts a specimen supporting table 5 for linear, endwise movements. The table 5 extends beyond the ends of the support 4 and at each of its ends mounts a wire coil unit 6 which may be formed of two parts, a voice or driving coil 7 and a restoring coil 8 (FIG. 6). The coil unit 6 has its coil parts 7 and 8 mounted on a tubular form 9 which may be a non-magnetic and preferably non-metallic tube as shown in FIG. 6, or the coils may be impregnated with a bonding material 26 (shown in FIG. 9 and explained later herein) to provide a rigid coil extension on each end of the table.

The table and its support are illustrated separately in FIGS. 3, 4 and 5, wherein the support is U-shaped with opposed V-shaped, 90° gibs or guides 11 in which V-shaped sides 12 of the table are guided for linear travel with a very close tolerance in the bearing surfaces. Both faces of each of the gibs or guide grooves 11 at each side of the support are provided with passages 13 that open outwardly through the faces of the gibs at frequent intervals along the lengths of the gibs, and at their inner ends are connected to a header (see FIG. 4), which leads to a supply conduit 14 at each side of the support. Each conduit 14 is connected to a source of air under relatively high pressure, so that the air under pressure escapes into the gibs, between their faces and the faces of the V-shaped edges of the table that slides therein, and provides a linear air bearing for the table in its support. Satisfactory air pressures for this bearing may vary, for example, from about 10 to 100 lbs. From 10 to 15 lbs. air pressure were sufficient to levitate a 15 lb. steel table 5 on the air bearing and to provide virtually frictionless motion.

The clearance between surfaces of the table bearing may be about 0.0004 inch, for example, so that the bearing surfaces must be ground flat to within about plus or minus 0.0001 inch. The table thus may slide longitudinally or endwise in its support on a cushion of air which makes the frictional resistance to the movements of the table almost nil. When base 1 and table support 4 are properly leveled, the table floats or is levitated freely and essentially frictionlessly in stable equilibrium, in the vertical plane and neutral equilibrium in the horizontal plane. Contrary to conventional vibration machines, no spring supporting arms are required, since support as well as accurate positioning are provided by the motion of the thin layer of air between table and gibs. Such arms would introduce undesired natural frequencies within the operating range of the machine, causing resonant, and anti-resonant peaks and valleys in the response, and restricting linear travel of the table to small displacements. The restoring force rises steeply perhaps up to the 6th or 7th power of displacement, for vertical or horizontal displacements at right-angles to the gibs, so that canting and other transverse motions of the table are effectively eliminated, even in the presence of large dead weight and off-center, resonant loads. Furthermore, this type of support makes the table extremely stable and capable of supporting very heavy loads, even hundreds of pounds, without appreciative downward displacement. Thus when a load is placed on the table of such a nature as to make the table unbalanced, the air bearing prevents canting of the table during its linear movements in its bearing. In similar manner, the transverse motions which might otherwise be introduced due to the resonance of part or all of a massive load as the table is caused to vibrate at the natural frequency of the load, is repressed by the great restoring forces introduced by even small displacements.

To impart the desired linear endwise movements to the table, magnetic attraction and repulsion is employed between the ends of the table and the abutments 2 and 3. A simple manner of accomplishing this is to employ a continuous magnetic field and an electromagnet which has relative movement with respect thereto. In the embodiment illustrated in FIGS. 1–6, the continuous field is created by a permanent magnet and the electromagnet has relative movement in the magnetic field of the permanent magnet. The permanent magnet unit of FIGS. 1 and 2 is illustrated in section in FIG. 6, and includes a basket-wall shaped permanent magnet 15 attached at one of its ends to a base plate 16 of high permeability material such as of soft iron, and at its other end having an annular soft iron pole piece 17 with an internal annular flange at one end. The base 16 has a central post 18 of soft iron or other high-permeability conducting material and it extends for the full length of the magnet 15. Resilient bumper stops 19 may be provided on the outer face of closure 17, to prevent damage from any unexpected over-travel of table 5.

A tubular form 9 is attached to each end of the table 5 by a disc 21a that is detachably confined on an end of the table, preferably with provision (not shown) for adjustment laterally on the table in order that one may be able to center accurately the tubular form 9 relatively to the post 18. This tubular form 9 moves coaxially over the post 18 and also within the annular ring 17, so that when the table moves linearly the coil unit 6 will move back and forth across the radial, homogeneous magnetic field between annular magnet 15 and the center pole post 18. Current is supplied separately to the coil parts 7 and 8 through flexible conducting means 21. With this arrangement, if an alternating current is supplied to the voice or driving coil parts 7, the magnetic action between these coil parts and the permanent magnet, according to the well known Faraday-Henry principle of force on a conductor carrying current in a magnetic field, will cause the table to vibrate endwise at the frequency of the alternations of the current.

The coil part 7 at one end of the table is connected to apply a repelling force to its end of the table when there is a magnetic attraction force applied at the same time to the other end of the table. This provides a push-pull vibration of the table (with its attendant reduction of distortion of the motion) without the use of push rods or linkages to convey the forces developed, with their attendant resonances that could introduce false and undesired auxiliary forces upon the movable table. It should be noted that the moving member is a large, rigid body. Thus, the first spurious resonance (due to other than the design parameters of table mass and suspension stiffness) would be that of the isolated body "ringing" (in the absence of supporting springs, which are lacking in this design). This ringing can be made to occur at frequencies above the audio range, because of the high table rigidity. A coil 8 is utilized to provide a restoring and damping force to overcome the aforementioned deficiencies and is explained below in conjunction with FIGURES 11 and 12. Unless restoring forces are also applied, the table would be free to float and operate about an arbitrary center which would be defined merely by the last forces applied to the table or by the remnant vibration of the surface on which the actuator is placed. If the table support 5 and base 1 are not carefully levelled, the table may float to one extreme end of its travel and attempt to work from that position. For these reasons, and also because a restoring or centering force would be required in the case of trying to reproduce mechanical shock impulses (which would also require damping for proper reproduction), provision is made to provide a damping and restoring or centering forces for the table.

In the embodiment of the invention illustrated in FIGS. 7 and 8, permanent magnets 21b are fixed to the opposite ends of the table so as to move with the table 5, and the electromagnets 22 are fixed on the support. This simplifies the circuit connections to the electromagnet, and removes the possibility of local resonances of the coil structure, which may be transmitted to the movable table if they were mounted thereon. Only one coil at each end of the table is illustrated for the electromagnet; this coil is supplied with an alternating current to cause the linear vibration of the table. The permanent magnet has a cylinder 23 of metal which is magnetized to have a continuous north pole at one of its ends and a south pole at its other end. One end of the ring is secured to a disc 24 of high-permeability material such as soft iron, from a face of which a central post 25 of similar material extends within and concentric with the ring, with its free end face in approximately the same plane as the adjacent free end face of the ring 23.

In FIG. 9, the arrangement is somewhat similar to that explained in connection with FIGS. 1–6, except that the coil parts 7 and 8 are arranged end to end, instead of being concentric with one another. While the two coil parts 7 and 8 can be mounted end to end on a tubular form, they are shown here as bonded together into a self supporting form by a suitable bonding or potting material 26. Each of these two units of coils and potting material is secured to a disc 27 and by it to an end of the table 5. In this arrangement the arrow heads represented by dots in the turns of coil parts 8 indicate that the direction of current flow in those turns is out of the paper and forwardly, and the arrow tails, represented by the crossed lines in the turns, indicate that the direction of current flow in those turns is from the front into the paper. The permanent magnet 23 in this example is fixed to the support instead of to the table 5. The driving or voice coil part 7 utilizes substantially the entire length of the region of constant magnetic field strength, and the restoring or centering coil parts 8 do not enter this field region, but is about to enter it, so that they experience largely only the fringe field from the permanent magnet.

A suitable circuit for the coil parts 7 and 8 of FIG. 9 is illustrated in FIG. 10. The voice or driving coils 7 are connected in series with each other and with a source of alternating current or signals. The restoring or centering coils 8 are also connected in series with one another and with a potentiometer 28 and a variable resistor 29. The potentiometer is supplied with direct current from a battery 30 which provides the restoring current. The potentiometer 28 when adjusted varies the restoring or centering current and hence the magnitude of the restoring or centering forces. Thus the restoring or centering force is under the control of the operator and may be adjusted to suit particular conditions when subjecting a specimen to a test. The effect of doing this is to change the lowest resonance of the table in its reciprocating mode of vibration. When using a 6 volt A-type, dry battery, a resonant frequency of about 1 cycle per second has been utilized. This lowest resonance is a function of the mass of the table and the stiffness of the equivalent restoring "springs." This stiffness is controlled by the magnitude of the current used and therefore by the force of the magnetic field developed. The restoring force, unlike that provided by conventional mounting springs, is not necessarily proportional to displacement. It will be a higher or lower power of the displacement depending on the configuration of the fringing field. Furthermore, this function may be modified by winding the restoring coil in a non-linear fashion.

When a direct current is passed through the centering or restoring coil parts 8 in directions such that the magnetic forces created by the direct current at the coil parts 8 are both urging the table towards the center, any slight displacement of the table from this position of equilibrium will unbalance these magnetic forces and then the forces will push the table toward the position of equilibrium.

The resistance of resistor 28 and of the battery 30 are chosen to be very low as compared to the resistance of the coil parts 8 themselves. Thus, not only is the restoring or centering force and therefore the equivalent spring stiffness variable, but the damping experienced by the table is also variable, and is controlled by the value of resistor 29. The restoring coil parts 8 are illustrated as being formed of larger diameter wires than the wires of coil parts 7, so that its resistance will be very low compared to that of the winding of the voice coil part 7. This is intended to insure that the damping of the vibrations of the table will be controlled by the restoring or centering coil parts 8, rather than by coil parts 7. This is merely diagrammatic; the total resistance of the centering coils must be less than that of the driving coils and this is true even if the wire diameters are the same for both types of coils. If the wires are of the same diameter, the lengths of the wire in each coil determines its resistance.

This method of damping is less expensive than providing variable damping by changing the equivalent driving impedance of the coil parts 7 by means of variable feedback paths, such as is done conventionally in modern high-fidelity audo amplifier systems.

Consider now the situation when an alternating current is applied to the voice or driving coil parts 7. Let it be assumed, for example, that the voice or driving current tends to move the table toward the left. Then as the table moves away from its center or equilibrium position, the force directed toward the center on the left hand coil part 8 increases, while the force towards the center on the right hand coil part 8 decreases by virtue of the fact that the left hand coil part 8 is getting closer to the strong magnetic field, while the right hand coil part 8 is retreating from the strong part of the permanent magnetic field. The net force on the table due to the coils 8 will be towards the center or equilibrium position. At the center or equilibrium position the forces urging the table toward that position are equal and opposite, and serve only to keep the table under compression.

As the table moves further to the left, the magnetic force steadily increases so that the force tending to restore the table to its center or equilibrium position is oppositely directed to the displacement, but not necessarily proportional to that displacement. This restoring or centering force may be modified by winding the restoring coil parts in a non-linear fashion, such as by changing the spacing between adjacent turns to yield the desired result. The action on the table, when it is displaced in the opposite direction by a change in the direction of the alternating or signal current will be similar and urge the table again towards the center or equilibrium position.

In order to obtain the restoring or centering force and for damping, with the coil arrangement of FIG. 6 it is necessary to use the circuit illustrated in FIGS. 11 and 12 which provide longitudinal commutation with switching. This latter function is achieved by the use of a double-pole, double-throw reversing switch 31, illustrated schematically in FIGS. 11 and 12, that is included in series in the circuit of the coil parts 8. This switch 31 includes contact shoes A and B (FIGS. 13 and 14 also) which slide along and in contact with conductor strips 32, 33, 34 and 35, the shoe A sliding along strips 32 and 33 alternately, and the shoe B sliding along strips 34 and 35 alternately. In the centered position the shoes A and B are out of contact with their related strips.

The shoes A and B are carried side by side by attachment to the under face of the table and the conductor strips are mounted on and insulated from the upper face of the bottom or cross part of the table support 4 as shown schematically in FIGS. 13 and 14. The restoring coils 8 are in series with each other and with a variable resistor 36 and a potentiometer 37, but through the reversing switch. One end of the series connected coils 8 is connected by wire 38 to shoe A of the reversing switch 31 and the other shoe B of the switch 31 is connected by wire 39, through the variable resistor 36, to the other end of the series connected coils 8. Strip 32 is connected by wire 40 to the potentiometer 27 and to strip 35, and strip 33 is connected by wire 41 to strip 34 and to the adjustable runner or tap of the potentiometer 37.

In FIGS. 11, 12, 13 and 14 the shoes A and B are illustrated as in their centered or equilibrium positions. Assuming that the direction of flow of current in coil parts 7 at any moment causes the table 5 to move to the right in FIGS. 11–14, a very slight movement of these shoes A and B with the table will bring them in electrical contact with strips 33 and 35, respectively, which causes restoring current to travel from the battery through wire 40, strip 35 and shoe B to and through the coils 8, to shoe A and back to strip 33 and by wire 41 to the adjustable tap of the potentiometer 37. The coils 8 are connected so that the direction of current therethrough produces a force on both coils 8 directing their movement, by the magnetic action, to the left in FIGS. 12 and 13.

When the table reaches a position where the shoes A and B are at the positions, A' and B', shown by dotted lines in FIG. 12, and the current in the driving coils 7 begins to reverse (assuming sinusoidal driving current), then the table will come to a complete stop and commence its travel in the opposite direction; that is, to the left in FIGS. 11–14. When shoes A and B leave strips 33 and 35, for an instant the restoring or centering coils 8 will not be energized, but as the table continues its movement beyond its centered or equilibrium position, the shoes will contact strips 32 and 34. Then the restoring or centering current flows in the opposite direction through the coils 8 so that the centering or restoring forces will urge the table to the right. In order to minimize the abrupt or transient interruption of the restoring current while A and B are passing through the equilibrium position and therefore not contacting either set of contact blocks 32, 33, or 34 and 35, a condenser 43 is provided across A and B as shown. This avoids switching transients that would otherwise be generated, and also minimizes sparking as the contacts are made and broken. The restoring forces differ from springs in that they supply a constant force irrespective of displacement, directed toward the center or equilibrium position.

When it is desired that the restoring forces behave exactly like springs; that is, be proportional to displacement and oppositely directed, the strips 32, 33, 34, and 35 are made of an electrically resistive material such as graphite, for example, on the contact surfaces. Then as the shoes A and B move along the strips, there will be a resistance in the circuit determined by the positions of the shoes along the strips, and the resistance of the strips in the circuit will decrease linearly with displacement, thus increasing the current and thereby the force linearly. When one desires the restoring forces to be non-linear, the resistive strips 32, 33, 34 and 35 are tapered (changing in width or thickness with length) to correspond to whatever change in resistance is desired. In this embodiment, the variable resistor 36 controls the amount of the electromagnetic damping generated by the coils 8 in the magnetic field.

The equilibrium or center position about which the table will move, is determined by shifting an insulating plate 42 (FIGS. 13 and 14) on which the strips 32, 33, 34 and 35 are mounted, along the table support 4. Slots 42b provide for this motion, and screws 42a secure the insulating plate 42 in different adjusted positions. This ability to set the center position at will is very convenient for the reproduction of electric pulses which may be utilized to produce repeated low-"g," long duration shocks, for example. That is, if a series of pulses from zero to say 10 amperes and back to zero, are fed to the drive coils 7, the table will move from a zero position to an extreme of travel and back to zero. In this instance the center of equilibrium position could be chosen at one end of the possible travel of the table, allowing for the maximum travel to the other end, which would then be twice the possible amplitude allowable under sine wave excitation.

Another way of providing efficient restoring force and damping to the table is illustrated in FIG. 15 where only one pair of coils is employed for carrying both the drive or signal current and the restoring force current. The coils 44 and 45 of this pair are connected in series with one another, and by wires 46 and 47 in series with the secondary winding 48 of a transformer 49 and with the shoes A and B of a reversing switch 50 that is similar to that shown in FIGS. 11–14. A battery 51 is connected to the ends of a resistor 52, and a movable tap 53 on the resistor, and each end of the resistor 52 is connected to the reversing switch as explained for FIGS. 11–14. A condenser 54 is connected in shunt across the contact shoes A and B, and here that condenser not only eliminates or reduces sparking at the shoes A and B, while providing for essentially continuous restoring force, but it also maintains the signal or driving current without interruption, even while the shoes A and B are moving through equilibrium position, and hence not in contact with the strips. This avoids switching transients that would otherwise be generated. The condenser impedance here should be low as compared to that of the secondary 48 of the transformer 49 to avoid excessive drop of signal voltage across it.

In this embodiment of the invention, the current through the single pair of coils is the superposition of the signal or driving current, caused by the voltage generated in the secondary 48 of the output transformer 49 of the power amplifier (not shown) driving the table, and of the switched direct current from the battery which may vary when the graphite strips of the reversing switch are used. This direct current is supplied by the battery 51. By using only one pair of coils 44 and 45, the necessarily limited annular air gap between the magnet pole pieces and each coil is better utilized, since the wire diameter, or the number of turns, or both for each coil may be increased to fill this gap. The construction is also simpler and cheaper. The equilibrium position of the table is set by shifting the insulation plate which mounts the conducting strips, as explained in connection with FIGS. 11–14.

Any desired source of power may be used to drive any of the circuits shown, although the prime applications of this invention would probably employ an electronic power amplifier so as to reproduce any desired complex wave such as random noise, or signals recorded from accelerometers in the field on tapes, or electrical pulses of any desired shape, as well as steady and frequency-swept sine waves. Other possible drives are motor generator sets, electronic pulsing circuits, and electronic and electromechanical wave-shaping means. In the embodiment shown in FIG. 15, although the damping is generated efficiently, since the magnetic coupling to the relatively moving coil is as good as possible, it is limited somewhat by the impedance of the transformer secondary. The damping may be decreased by inserting a rheostat in the driving coil circuit but the maximum damping is controlled by the impedance of the transformer secondary.

In FIGS. 11–15, if hunting should occur due to the table seeking an equilibrium position between contacts 32—34 and 33—35 of FIGS. 11–14, it can be suppressed by providing additional or auxiliary damping, such as by a dashpot active at the equilibrium position of the table. Without this, high frequency or very low displacement signals would be reproduced as modulations of very low frequency, low-g motion. The variable damping illustrated is effective for any of the larger displacement motions, however.

In FIG. 16, a very simple type of restoring force is illustrated which is the permanent magnet equivalent of the action occurring in the device shown in FIG. 9. As the motion of the table 5 causes permanent magnet 55 that is movable therewith, to approach one pole of the horseshoe magnet 56, the force generated between these magnets, directed to the left in the drawing for example, increases while the force generated at the other side of magnet 55 decreases. To decrease the restoring force the magnet 56 is moved away from the table. A coil 57 on the center of the horseshoe magnet 56, with a variable rheostat 58 in series with it in a closed circuit enables one to vary the damping action.

Figure 17:
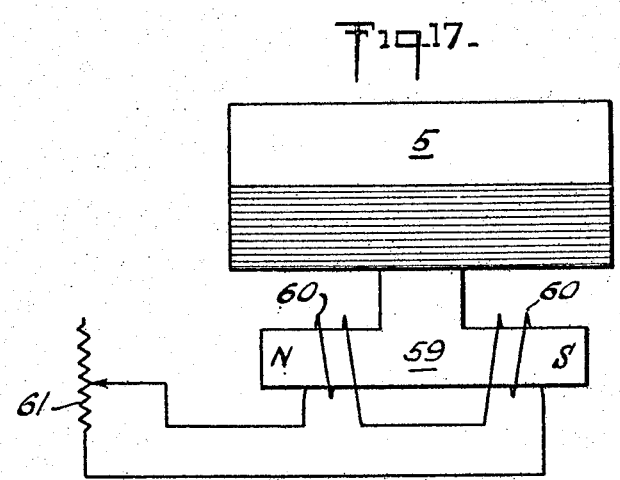
FIG. 17 is a schematic drawing illustrating a still further possible modification of the actuator.

FIG. 17 illustrates a very simple way of providing variable damping for any of the various embodiments of the invention. With this construction the table 5 carries a bar permanent magnet 59 for movement therewith, with the bar approximately parallel to the direction of vibration of the table. A coil 60 surrounding the bar, such as at its polar ends, but not movable with the bar, has a variable resistor 61 in series with it in a closed circuit. The movement of the bar magnet 59 endwise of itself with the table, back and forth in the coil generates currents in the coil 60 which exerts a damping action on the table movement. By adjusting the resistor 61, the amount of such damping can be varied.

In the event that the mass of the table is found to resonate with the compliance of the levitation forces of the air in the table bearing, and it is insufficiently damped so that appreciable transverse motion develops, this resonance can be brought out of the desired frequency range of operation of the machine by changing from compressed air supplied to the table bearing to some other gas, the properties of which are sufficiently different from air so that the apparent stiffness and the damping are altered appreciably, or by changing the clearance between the movable table and the gibs, or by providing an excess area of bearing in the mating surfaces over that needed to float any expected load, so that the gas pressure supplied for levitation of the table may be changed over a wide range, thus varying the "stiffness" of the supporting forces, or any appropriate combination thereof. One may also vary the mass of the table through variation of the shape or material, employing structures that provide a high stiffness-to-mass ratio.

An actuator embodying this invention has:

(1) An extremely wide range frequency response, with no extraneous resonances, (2) Ability to reproduce complex wave forms and single long duration transients requiring large amplitudes of motion so that the machine may be used for low "g," long duration shock testing, over a wide range of "g" and duration, (3) Stability under conditions of vertical loading, (4) High resistance to transverse vibrations, even under large loads or non-symmetrically placed resonant loads, and (5) Variable restoring and damping forces.

This actuator is not critical as to dead load so that a very stiff and heavy table can be employed, and the air or gas bearing provides a resistance to canting of the table under unsymmetrical loads and resonant loads. With it one can obtain a longer drive or larger amplitudes of movement than with springs.

It will be understood that various changes in the details and arrangements of parts, which have been herein described and illustrated in order to explain the nature of the invention, may be made by those skilled in the art within the principle and scope of the invention as expressed in the appended claims.

I claim:

1. An electrodynamic actuator comprising a table, a support mounting said table for approximately horizontal linear movements, means responsive to a variable current for causing said movements of said table, and means for providing a variable damping for said table including a magnet attached to and movable with said table and having its polar ends spaced apart in the direction of said linear movements, and a closed circuit having in series therein a variable resistance and a wire coil carried by said support and wound about but separate from said magnet intermediate of the ends thereof, whereby the movement of said magnet relative to said coil will exert a damping force the effectiveness of which may be varied by operation of said variable resistance.

2. An electrodynamic actuator comprising a table, a support mounting said table for approximately horizontal linear movements in a gaseous bearing with close tolerances in the bearing providing levitation of the table in said support during its movements, a hollow core of a non magnetizable material extending from each end of the table in alignment with one another, a wire driving coil wound on the exterior of each of said core, a pair of magnets on said support, one at each end of the table, and each having one pole telescoping within the hollow core at the adjacent end of the table, and its other pole telescoping with the core and coil wound thereon exteriorly thereon on the adjacent end of said table, circuit means includes a transformer with a secondary winding thereof in series with said driving coils, a source of direct current, reversing means connecting said source of direct current to the circuit of said coils in series therein and operable to alternately reverse the direction of current flow from said source of direct current through said coils, a condenser connected in shunt across said reversing means, and means by which said reversing means is operated by said table during its movements, whereby said coils serve as both driving and restoring coils when a variable current is applied to the primary of said transformer but only as restoring coils when said variable current is interrupted.

3. An electrodynamic actuator comprising a table, a support mounting said table for linear movements in opposite directions, electromagnetic means acting on said table for causing said linear movements of said table, circuit means controlling said electromagnetic means, and additional circuit means controlled by the position of said table for causing the application of restoring forces to said table and including switch contacts carried partly by said table and said support for reversing the direction of the applied restoring forces and coacting to return the table to an intermediate equilibrium position and varying automatically the effectiveness of said restoring forces as a function of the extent of displacement of said table at either side of said equilibrium position.

4. The actuator according to claim 3, wherein said additional circuit means includes a pair of series connected coils mounted on opposite ends of and carried by said table and, a series path including therein said coils, a selectively variable source of direct current, said reversing switch contacts and a variable resistance.

5. The actuator according to claim 4 further including a capacitor connected across said switch contacts.

6. An electrodynamic actuator comprising a table, a support mounting said table for approximately horizontal linear movements in a gaseous bearing with close tolerances in the bearing providing levitation of the table in said support during its movements, a hollow core of a nonmagnetizable material extending from each end of the table in alignment with one another, a wire driving coil wound on the exterior of each said core, a pair of magnets on said support, one at each end of the table, and each having one pole telescoping within the hollow core at the adjacent end of the table, and its other pole telescoping with the core and coil wound thereon exteriorly thereof on the adjacent end of said table, and circuit means connected to said coils for causing linear movements of said table when a current varying polarity is applied to said coils, the direction of winding of said wire coils causing a push on either end of the table due to the magnetic action of the adjacent magnet and coil at that end of the table, and a simultaneous pull at the opposite end of the table by the magnetic action between the magnet and coil at such opposite end of the table, additional wire coils, one on each of said cores, cooperating with the adjacent said magnets for applying magnetic forces to restore said table to a selected reference position when current is applied thereto and said driving coils are inactive, and means connected to said additional coils for reversing the direction of current flow through said additional coils, and means operated by said table in its movements for operating said reversing means and thereby determining the direction of application of the restoring forces that urge the table to its equilibrium position.

References Cited in the file of this patent

UNITED STATES PATENTS

| | | |
|---|---|---|
| 2,289,962 | Hancock | July 14, 1942 |
| 2,557,856 | Angst et al. | June 19, 1951 |
| 2,599,036 | Efromson et al. | June 3, 1952 |
| 2,620,665 | Carlisle et al. | Dec. 9, 1952 |
| 2,688,456 | Jensen | Sept. 7, 1954 |
| 2,781,461 | Booth et al. | Feb. 12, 1957 |
| 2,859,391 | Ericson | Nov. 4, 1958 |
| 2,862,385 | Woods | Dec. 2, 1958 |
| 2,875,854 | Weber | Mar. 3, 1959 |